United States Patent [19]

Lemelson et al.

[11] 4,356,903

[45] Nov. 2, 1982

[54] PARKING METER

[76] Inventors: Jerome H. Lemelson, 85 Rector St., Metuchen, N.J. 08840; Christian Grund, 2035 Burr Ave., The Bronx, N.Y. 10461

[21] Appl. No.: 84,427

[22] Filed: Oct. 12, 1979

[51] Int. Cl.³ .............................................. G06F 9/00
[52] U.S. Cl. .................................. 194/1 R; 194/97 R; 340/51; 340/539
[58] Field of Search ................. 194/1 R, 97 R, 100 R, 194/DIG. 22; 340/539, 566, 51

[56] References Cited

U.S. PATENT DOCUMENTS

| | | | |
|---|---|---|---|
| 3,373,856 | 3/1968 | Kusters et al. | 194/100 R |
| 3,482,110 | 12/1969 | Robinson | 194/97 R X |
| 3,909,826 | 9/1975 | Schildmeier et al. | 340/539 X |
| 3,948,375 | 4/1976 | Selby | 194/1 R |
| 4,031,991 | 6/1977 | Malott | 194/DIG. 22 |
| 4,080,598 | 3/1978 | Cardone | 194/97 R X |

Primary Examiner—Joseph J. Rolla

[57] ABSTRACT

A meter is provided for measuring time, such as a parking meter, which employs an electronic circuit to effect such time measurement and an electrically operated display such as light emitting diode or liquid crystal display for indicating the passage of time from a starting time determined, for example, by the insertion of a coin into a receptacle and/or by the pushing of a button or pivoting of an arm. In one form, one or more of the actions of inserting a coin into the meter receptacle, pushing a button to initiate its operation or pivoting an arm by finger operation is operable to energize an induction member for generating electrical energy which is stored in a battery or other power supply and is employed thereafter to operate electronic circuits for keeping and indicating time, such as passage of minutes from the starting time of the meter until the time has run out. An indication that the timer has totally uncounted or counted to a predetermined value is had either by the reading of the electronic digital display, the operation of an electric lamp and/or the energization of a solenoid or motor driving or releasing an indicator such as a flag or arm to indicate the runout of time. In another form of the invention, when the timing or time indicating device of the meter has run out or uncounted, a code generating circuit and short wave generator for the code thereof are energized to transmit a short wave code to a monitor station or a portable device carried by a meter attendant for warning the attendant of such condition. In another form, a sensing arrangement is provided for sensing if a vehicle is located at a parking meter and the meter is not in active operation and for either indicating such condition by energizing a lamp or release for a flag and/or by generating and transmitting a short wave code signal to a remote monitor station where the signal indicates the location of the meter and such condition.

7 Claims, 6 Drawing Figures

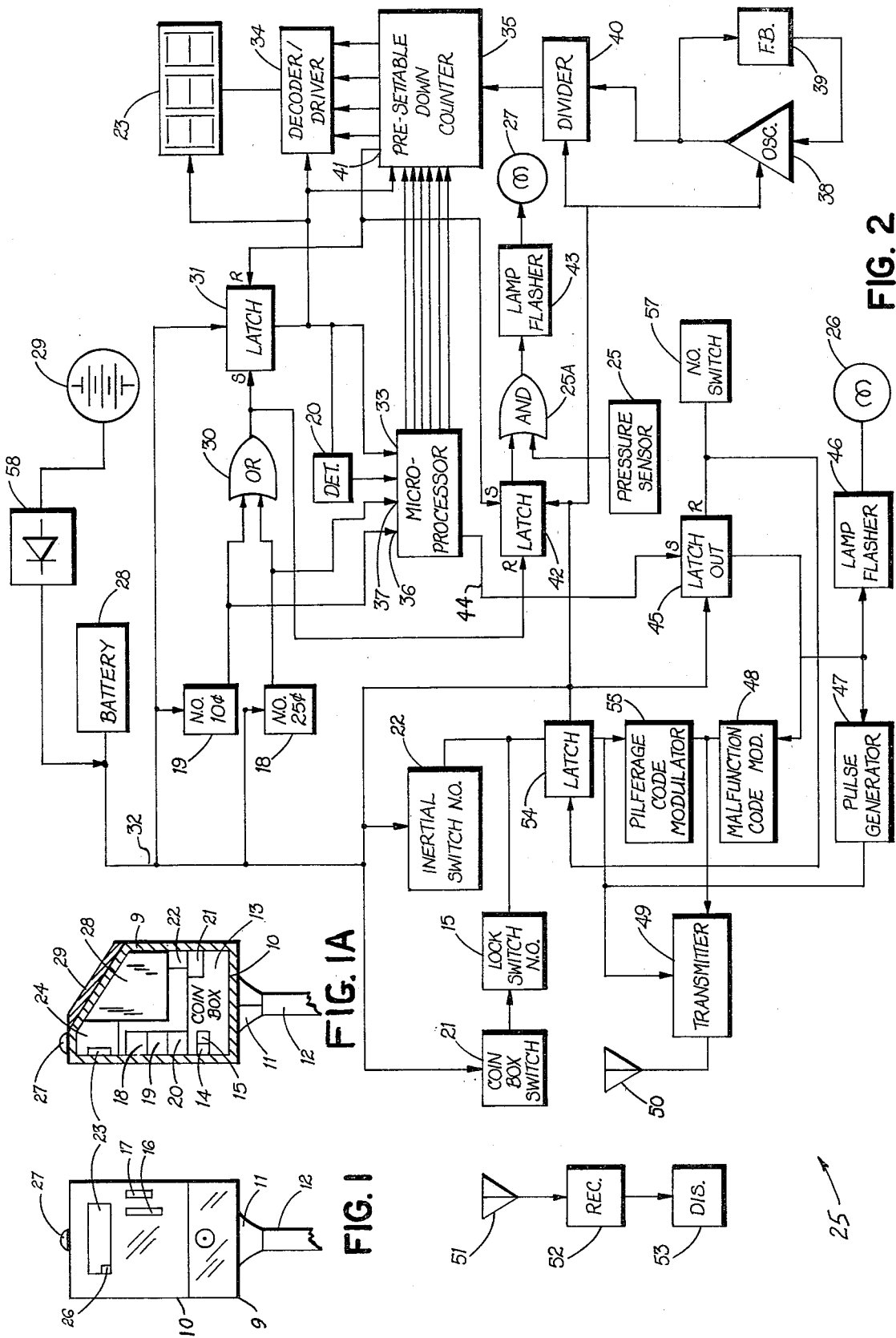

PARKING METER

SUMMARY OF THE INVENTION

This invention relates to improvements in meters, particularly time indicating meters such as parking meters and the like which are activated by the turning of a handle, pushing of a button and/or insertion of a coin. Heretofore, most meters employed to indicate the passage of time have been constructed to operate by the unwinding of a spring. While such mechanism has performed quite satisfactory for many applications, it suffers many shortcomings including susceptibility to vandalism. A purely mechanical parking meter, for example, may be easily broken into and easily rendered inoperable by vandals using simple tools.

The instant invention is directed to a meter, such as a parking meter, which may be simply constructed of microminiature electronic circuitry, such as single microelectronic devices employed to keep and indicate time in response to the closure of a switch by a coin or a simple mechanism enabling switch closure after the coin is inserted. The electronic microprocessor or chip is either battery operated or operated by electrical energy generated by an induction means which is actuated by the coin, a push button or arm turned to initiate the meter operation. Display or indication of time may be effected by the illumination or switching of LED or LCD numerical display units or such means for displaying time other than numerically. The entire electronic circuit including the display therefor may be encapsulated within a suitable shock absorbing and vandal-proof material such as an epoxy resin and mounted within a steel casting which cannot be easily broken into, broken or destroyed.

Accordingly, it is a primary object of this invention to provide a new and improved meter and a method for indicating the passage of time.

Another object is to provide a new and improved structure in a parking meter.

Another object is to provide a parking meter having a minimum number of moving parts.

Another object is to provide a parking meter which is constructed to minimize the possibility of its being broken into, damaged or destroyed by vandalism or burglarism.

Another object is to provide an electronic meter for indicating the passage of time up to a particular maximum time wherein the operation of the meter up to said maximum time may be effected by electrical energy generated by a person initiating the operation of the meter.

Another object is to provide an electronic meter, such as a parking meter or the like, operable to generate and transmit a code signal or signals to a remote location to indicate the condition of the meter.

Another object is to provide a parking meter system for remotely indicating when any meter has run out.

Another object is to provide a parking meter system for remotely indicating those meters which have run out at locations where there are parked automobiles.

Another object is to provide a parking meter which will uncount or reset itself when a vehicle parked at the space defining the meter parking location is driven away from such location.

Another object is to provide a parking meter which does not necessitate rewinding by the coin collection operator of the meter.

Another object is to provide a parking meter having a minimum number of mechanical parts and requiring little maintenance.

With the above and such other objects in view as may hereinafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawings:

FIG. 1 is a front view of the exterior housing of an automatic electronic parking meter.

FIG. 1A is a side view of the parking meter of FIG. 1 with the end wall removed showing the interior layout of components.

FIG. 2 is a schematic diagram of the electronic system employed in operating the parking meter of FIGS. 1 and 1A.

Figure 4:
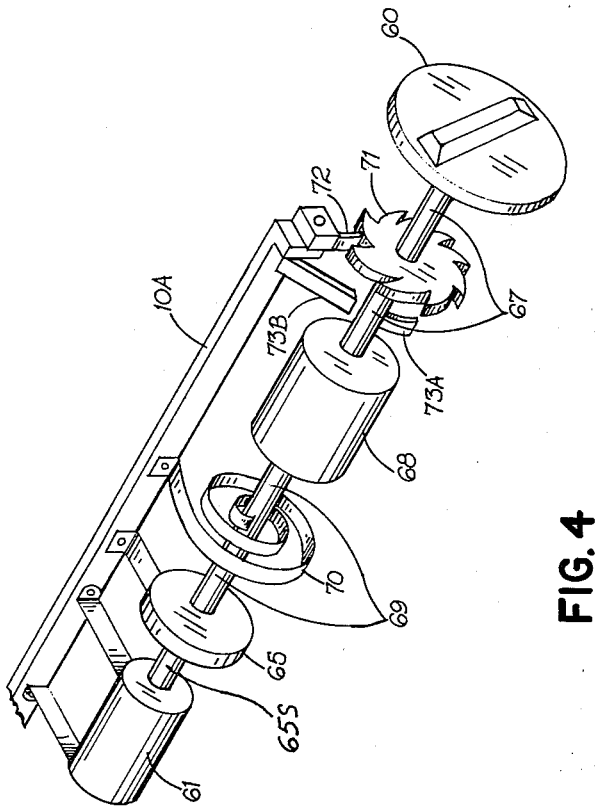
FIG. 4 is an isometric view of a manually operated mechanism associated with an electrical energy generator forming part of a parking meter for energizing electronic circuits in the meter.

In FIG. 1 is shown the physical arrangement of a parking meter 9 employing electronic means in the form of a microprocessor controlled system for indicating time lapse relative to the insertion of a coin or coins therein and overtime or time readout. The parking meter is housed in a heavy casting 10 which is mounted on a flange 11 supported by a post or pipe 12. Contained within the housing 10 is a coin box 13 for receiving and storing deposited coins which may be accessed or emptied by means of a key operated lock 14 containing an integral normally closed electrical switch 15 which opens when a suitable key is employed and is disposed within the receptacle of the lock. A coin receiving slot or slots contains a chute or respective chutes for the deposition of different coins. In the embodiment illustrated, slot 16 is operable to receive a larger coin such as a quarter and a second slot 17 is provided for receiving a smaller coin such as a dime, each of which may represent different lengths of time purchased by the insertion of respective coins in such slots. Normally open switches 18 and 19 respectively respond to the passage of a quarter and a dime while a bogus coin detector 20 is provided which may respond to coin weight or other parameters such as diameter, thickness or surface configuration, to prevent the receipt and employment of a bogus coin for the purchase of time. Other features include a normally open coin box removal switch 21, and an inertial switch 22, a time remaining display 23, an electronics package 24 containing electronic circuitry 25 which may be potted or sealed within a suitable potting material, such as a potting resin, to prevent damage from vandalism and environmental corrosion. Also provided is an electronic malfunction indicator 26, a time expired indicator 27, and a rechargeable battery 28 fed by an attendant solar-to-electrical energy cell 29 which serves as a recharging means for the battery. In FIG. 2 is shown details of the electronic system 25. When a coin is deposited in slot 16 or 17, it drops by gravity down its chute and in so doing actuates normally open switch 18 or 19 to close which, in turn, actuates one input of an OR gate 30 which then sets a latch 31 transferring power from a power bus 32 to a microprocessor 33 containing suitable control electronics. Electrical energy is also passed to the bogus coin detector 20, the display 23, and a decoder driver 34 as well as a presettable countdown counter 35, all of which components are normally de-energized to conserve power. The coin operated switch 18 or 19 remains closed long enough to effect full power-up or energization of all circuits controlled by latch 31 and the operation of bogus coin detector 20 which, if it senses a bogus coin, inhibits the microprocessor 33 from registering the deposition of a coin and resets latch 31 in a manner to be described.

If the coin deposited is genuine, latch 31 is set as described, activating all of the circuits and the microprocessor 33 which determines the value of the coin deposited by querying input line 36 for dimes and line 37 for quarters. The presettable downcounter 35 is also energized to a predetermined time setting which corresponds to the quantity and amount of coins deposited. The counter 35 is then made to count backwards from the preset time by clock pulses generated by an oscillator 38 with its attendant feedback means 39. Oscillator 38 may be a quartz crystal or other suitable means having the proper stability and accuracy, and its signals are divided down by divider 40 to a frequency corresponding to the passage of time, for example, one clock pulse per minute or second. The output of counter 35 corresponding to the time count in its registers, is input to the decoder/driver and is subsequently applied to display means 23 which may comprise a bank of light emitting diodes or liquid crystal display units or other suitable means which operates to display the time left on the meter.

When the counter 35 uncounts or reaches a count of zero, the carry output 41 activates a reset input of latch 31 thereby shutting off the power to its controlled circuits which is a condition which also occurs if a bogus coin is detected in the manner previously described. The carry output 41 also sets a latch 42 which then transfers power from the power bus 32 to a lamp flasher circuit 43 which intermittently activates a time expired indicator 27 which may comprise a light emitting diode or other suitable means which gives a visual flashing indication of a violation condition. The latch 42 is reset, thus causing the lamp flasher 43 and indicator 27 to become deactivated, when another coin is deposited in either of the slots 16 or 17 and switches 18 or 19 are activated to cause the OR gate 30 to provide a true output. Means are also provided whereby the system 25 may indicate an attempt to pilfer or valdalize it or to indicate an internal malfunction thereof.

With each actuation of the meter as previously described, the microprocessor 33 is programmed to test itself and its peripheral electronics. If a malfunction is detected, the microprocessor 33 activates an output 44 which sets a latch 45 which then transfers power from the power bus 32 to a lamp flasher circuit 46, a pulse generator 47 and a malfunction code modulator 48. The lamp flasher 46 intermittently activates or energizes malfunction indicator 26 and thereby gives an indication of a nonfunctioning meter directly on the meter.

Malfunction code generator and modulator 48 are also activated and provide a unique code to a short wave transmitter 49, which code indicates the location of the meter and, when broadcast via short wave, indicates that a malfunction is present at such location. Pulse generator 47 intermittently transfer electrical power from the power bus 32 through latch 45 to the transmitter 49 which radiates the code signal on its antenna 50 which may be formed of all or part of the meter housing 10, or may comprise all or part of its stand or support. A remote receiver 52 receives signals sent by transmitter 49 on its antenna 51 and decodes such signals to activate a display means 53 which then displays the location of the meter and the nature of its transmission to thereby notify the proper authorities of such situation.

In the event that attempted pilferage or vandalism is effected, circuits are provided to detect such condition or abuse. A normally open inertial switch 22 is activated by a sudden disturbance in the position of the meter housing 10 such as when it is struck with a heavy object, thus setting a latch 54 which transmits power from the power bus 32 to the transmitter 49 and also energizes a pilferage code generator and modulator 55 which provides a unique code to the transmitter 49 and transmits such code via short wave, thereby indicating an attempted pilferage or damage to the meter. The signal transmitted is picked up by the remote receiver 52 which displays such condition on a display means thereof.

In the event that the coin box 13 is opened without an authorized key, the normally open coin box switch 21 is closed and power is transferred from the power bus 32 through normally open lock switch 15 to the set input of latch 54 to thereby indicate automatic pilferage as described above. When an authorized opening is effected of the coin box 13, such as by means of an authorized key, the normally closed switch 15 is opened so that power cannot be transferred to the set input of latch 54, thereby preventing the generation of a pilferage signal. A normally open key operated switch 57 is also included, which enables the pilferage latch 54 and the malfunction latch 45 to be reset by a key inserted by an authorized person to re-establish normal operation of the parking meter system.

Power for the active circuits of system 25 is provided by means of a rechargeable battery 28 which is kept in a charged condition by a solar battery charging means 29 through a diode 58 which prevents the discharge of the battery 28 when no light is present on the array 29. It is noted that any other power supply means may be employed, such as light power through a suitable power supply or by mechanical electrical generating means such as the movement of a lever or knob or the movement of a coin, either of which movements rotate an electro-mechanical generator as will be described.

Certain portions of the system described above may also be applied to automatic vending machines by substituting the controlled vending devices utilizing suitable driving circuitry for the counter 35, the oscillator 38, the feedback means 39, and divider 40, decoder/driver 34 and display 23. Portions of the system described may also be employed in a protection system for lock boxes such as safe deposit boxes and safes disposed at different locations in a building or group of buildings as well as locked rooms in buildings.

Figure 3:
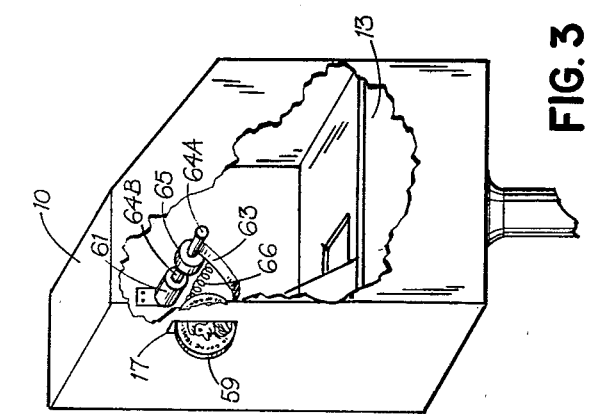
FIG. 3 is an isometric view, with parts broken away for clarity, of electro-mechanical means for energizing electronic components of a system of the type illustrated in FIG. 2.

FIG. 3 illustrates a mechanical arrangement of components employed in a parking meter of the type described whereby when a coin 59 is pushed through a slot 17 located in the front wall of the housing 10, such coin engages a groove arm 63 which is attached to the shaft 64 for rotating such shaft by force applied through the coin. The shaft 64 is connected to operate a gear box 65, the gears of which effect a substantial increase in the rotational speed of an output shaft 64B which turns an electrical energy generator 61 to generate a current which is applied in the manner shown in FIG. 5. The coin 59, after being pushed through the slot 17 falls under its own weight away from the displaced groove arm 63 down a chute into a coin box 13. A coil spring 66 is secured and operable to return arm 63 to a home position after the coin 59 has disengaged the arm 63.

In FIG. 4 is shown a mechanical arrangement wherein the manual rotation of a knob or lever 60 located on the outside of the parking meter housing, is employed to effect rotation of an electrical energy generator 61. Knob 60, when turned, manually rotates an attached shaft 67 which is connected to a one-way clutch 68 which functions to allow its output shaft 69 to rotate freely when the input shaft 67 is not being turned, but which rotates shaft 69 in response to the rotation of shaft 67. Shaft 69 winds coil spring 70 as it is rotated by the manual turning of the knob 60 and extends to turn the gears of gear box 65 so that the output shaft 65S thereof properly winds the input shaft 65C of the electrical generator 61 to which it is connected.

Once wound, spring 70 operates thereafter to rotate shaft 69 in the reverse direction, thereby rotating the input shaft to the gear box 65, without rotating the input shaft 67 since the latter is disengaged therefrom by means of the one-way clutch 68.

A ratchet and pawl 72 are connected to shaft 67 to prevent reverse motion of the shaft and knob 60. If improper rotation of knob 60 is attempted, pawl 72 will engage the ratchet teeth of ratchet wheel 71 preventing such motion. If proper rotation of shaft 67 is effected, pawl 72 slips easily over the back of the ratchet teeth allowing rotation.

A two-piece overtravel-stop 73A, 73B is provided to prevent damage to the spring 70 caused by excess torque on shaft 67. As shaft 67 is rotated, a travel stop finger 73A, which is attached to shaft 67, will engage a travel stop finger 73B, which is attached to a bracket 10A for support, to effect a positive stop. However housing component 10A is part of housing 10 and provides support for the components of this embodiment.

Figure 5:
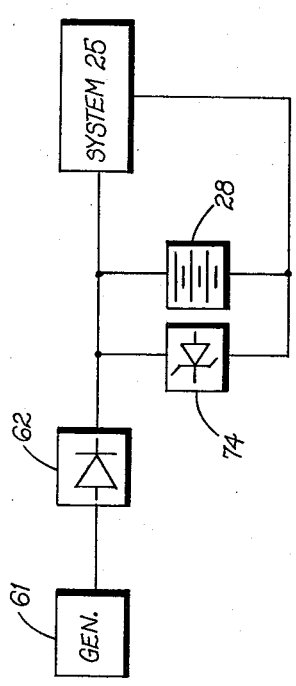
FIG. 5 is a schematic electrical diagram of components illustrated in FIG. 4.

In FIG. 5 is shown a power supply system where meter electronics of system 25 may be powered and a battery 28 may be recharged by the mechanical engagement of a deposited coin, as in FIG. 3, or by turning a shaft manually, as in FIG. 4. Either means will rotate a self exciting electrical generating means such as a magneto 61. The output of the magneto 61 is isolated by an isolation diode to pass current to a battery 28 or to system 25 but not in the reverse direction, thereby allowing the battery to discharge through generator 61. This action also protects the system from potentially damaging reverse currents. Additional electronic protection from potentially damaging over voltage may also be afforded by a zener diode 74 connected as shown in FIG. 5.

Other variations and modifications will become apparent to those skilled in the art by the disclosure herein and such modifications are deemed to fall within the scope of this invention.

It should be understood with respect to all of the embodiments described herein, that power supplies having the correct polarities and magnitudes are provided where not indicated in the drawings so as to supply proper electrical energy for appropriately operating the various illustrated circuits as described in the specification.

We claim:

1. An electronic parking meter comprising in combination:

a housing, a support for supporting said housing, an electrically operated numerical display secured to said housing and viewable from the exterior of said housing, coin receiving means for receiving and passing a plurality of coins of different denomination into said housing and storage means within said housing for coins received thereby, a source of electrical energy supported within said housing, electrical circuit means supported within said housing comprising:

(a) a computer in the form of an electronic microprocessor having a plurality of inputs thereto and a plurality of output circuits extending therefrom, (b) a plurality of normally open coin detection switches each operable to be closed upon insertion of a coin into said housing of a specific denomination and each operable to pass a signal, when closed, from said electrical energy source to a respective input to said electronic microprocessor, (c) said microprocessor containing circuit means responsive to signals generated by respective of said normally open coin detection switches and operable thereafter for generating digital code signals on a plurality of its outputs which code signals are indicative of the value of the coins presented to said coin receiving means, (d) a preset counter connected to receive digital code signals generated by said electronic microprocessor and operatively set thereby in accordance with the value of the coins presented to said coin receiving means as determined by the number of times each of said normally open switches are closed, (e) an attendant oscillator for causing said counter to uncount after being set to a specific value by coins presented to said housing, (f) said counter having a plurality of outputs, (g) a decoder-driver for said electronic numerical display connected to said plurality of outputs of said counter and operably connected to said electronic digital display to cause said display to display numerical indications of the time determined by the remaining count in said counter, (h) signal generating means operable when said counter uncounts for generating a control signal, and (i) indicating means connected to receive said control signal and controlled thereby to indicate that the time on the meter has run out, and (j) alarm means located remote from said meter, code generating means for generating a code indicative of the location of said meter and short wave transmitting means connected to said code generating means and operable in response to said control signal to short wave transmit the code generated by said code generating means indicative of the location of said meter when said counter has run out.

2. A parking meter in accordance with claim 1 wherein said alarm means is operable to indicate a malfunction in the operation of the meter.

3. A parking meter in accordance with claim 1 wherein said alarm means is operable to indicate an attempt to pilfer money from said meter housing.

4. A parking meter in accordance with claim 1 wherein said alarm means is operable to indicate an attempt to break into said housing.

5. An electronic parking meter comprising in combination:

a housing, a support for supporting said housing, an electrically operated display means secured to said housing and viewable from the exterior thereof, coin storage means within said housing and coin receiving means for receiving and passing a plurality of coins of different denominations to said coin storage means, a source of electrical energy supported within said housing, electrical circuit means supported within said housing comprising:

an electronic computer in the form of an electronic microprocessor having a plurality of inputs thereto and a plurality of output circuits, coin detection means including a plurality of normally open switches each operable to be closed upon detecting a coin of a specific denomination inserted into said housing and each connected to pass a signal, when closed, from said source of electrical energy to a respective input of said microprocessor, said microprocessor containing circuit means responsive to signals generated by respective of said normally open coin detection switches for generating digital code signals on a plurality of its outputs, a presetting counter connected to receive digital codes generated by said microprocessor and operatively connected to be set in accordance with the value of coins presented to said housing as determined by the number of times each of said normally open switches are closed, an attendant oscillator for causing said counter to uncount after being set to a specific value by coins presented to said housing, said counter having a plurality of outputs, a decoder-driver for said electrically operated numerical display connected to said plurality of outputs of said counter and to said electrical display to cause said display to display numerical indications of time determined by the remaining count in said counter, and means for generating a control signal when a condition exists with respect to said parking meter, which condition requires the attention of a parking meter attendant and applying said control signal to said electronic microprocessor, and alarm means controlled by said electronic microprocessor upon receipt of said control signal for indicating said condition requiring attention, and said alarm means is located remote from said parking meter, code generating means connected to receive said control signal and controlled thereby to generate a code defining the location of the meter, short wave transmitting means for receiving and short wave transmitting said code and means at said remote location for receiving the short wave transmitted code and converting same to electrical signals, and means for displaying an indication of the location of the meter from which short wave signals are received in response to the electrical signals generated from the short wave signals received at said remote location.

6. A parking meter in accordance with claim 5 wherein said alarm means is supported by said parking meter housing.

7. A parking meter in accordance with claim 5, further including means for detecting an attempt to pilfer coins from said housing, said latter detection means being operatively connected to said electronic microprocessor, said microprocessor being operable to control said code generating means and said short wave transmitting means to generate and transmit a code indicative of said attempt to pilfer coins from said housing to said receiving means at said remote location to cause the display thereat to indicate the location of the meter at which the pilferage attempt is made.

* * * * *